United States Patent [19]

Ishikuro et al.

[11] Patent Number: 5,039,554

[45] Date of Patent: Aug. 13, 1991

[54] PROCESS FOR PREPARING A BACKING LAYER OF A MAGNETIC RECORDING MEDIUM WHICH INCLUDES THE PREDISPERSING OF A FINE $\alpha$-$AL_2O_3$ POWDER IN A SOLVENT CONTAINING A SMALL AMOUNT OF BINDER

[75] Inventors: Tadashi Ishikuro; Hideaki Kosha; Masaaki Fujiyama, all of Kanagawa, Japan

[73] Assignee: Fuji Photo Film Co., Ltd., Kanagawa, Japan

[21] Appl. No.: 607,775

[22] Filed: Oct. 30, 1990

Related U.S. Application Data

[63] Continuation of Ser. No. 188,572, Apr. 29, 1988, abandoned.

[30] Foreign Application Priority Data

Apr. 30, 1987 [JP] Japan ................................ 62-104491

[51] Int. Cl.$^5$ ............................................. G11B 23/00
[52] U.S. Cl. .................................... 427/131; 428/323; 428/336; 428/425.9; 428/694; 428/900
[58] Field of Search ..................... 428/694, 425.9, 900, 428/323, 336; 427/131

[56] References Cited

U.S. PATENT DOCUMENTS

| 4,328,935 | 5/1982 | Steel | 242/192 |
| 4,414,270 | 11/1983 | Miyoshi et al. | 428/325 |
| 4,474,843 | 10/1984 | Miyoshi et al. | 428/212 |
| 4,567,063 | 1/1986 | Miyoshi et al. | 427/128 |
| 4,612,244 | 9/1986 | Kaneda et al. | 428/323 |
| 4,761,243 | 8/1988 | Kakuishi et al. | 252/62.54 |

Primary Examiner—Merrell C. Cashion, Jr.
Assistant Examiner—Stevan A. Resan
Attorney, Agent, or Firm—Sughrue, Mion, Zinn, Macpeak & Seas

[57] ABSTRACT

A process for preparing a magnetic recording medium by the steps of (a) forming a magnetic layer on one surface of a non-magnetic support and (b) homogeneously dispersing an $\alpha$-$Al_2O_3$ power having an average particle size of about 0.1 $\mu$m or less in a solvent containing a small amount of binder to form a dispersion, mixing the thus-prepared dispersion with a binder to provide a coating composition, and applying the coating composition to the opposite surface of the nonmagnetic support to form a backing layer. The magnetic recording medium has improved wear resistance, a low friction coefficient and excellent electromagnetic properties.

7 Claims, No Drawings

PROCESS FOR PREPARING A BACKING LAYER OF A MAGNETIC RECORDING MEDIUM WHICH INCLUDES THE PREDISPERSING OF A FINE α-AL$_2$O$_3$ POWDER IN A SOLVENT CONTAINING A SMALL AMOUNT OF BINDER

This is a continuation of application Ser. No. 07/188,572 filed Apr. 29, 1988.

FIELD OF THE INVENTION

The present invention relates to a process for preparing a magnetic recording medium, and more particularly, it relates to a novel process for preparing a magnetic recording medium having improved wear resistance properties without reducing electromagnetic properties and improved dropout (DO) properties, and having a backing layer with improved wear resistance.

The magnetic recording medium of the invention is suitable for any kind of magnetic tapes or magnetic floppy disk.

BACKGROUND OF THE INVENTION

It has generally been required that a magnetic recording medium for sound-recording, image-recording or computer use permit high density recording, and a magnetic recording medium having a metal thin film as the magnetic recording layer has drawn much attention and has been commercially available for high density recording. The metal thin film can be formed by a vapour deposition method such as vacuum evaporation, sputtering, or ion-plating such as electro-plating or electroless plating.

A surface of a magnetic layer of a magnetic recording tape for sound-recording, image-recording or computer is made smooth to improve output in the short wavelength region. A high density magnetic recording tape having a backing layer on the opposite side of the support to the magnetic layer to improve running properties and durability has been commercially available.

However, the backing layer provided by a conventional method on the opposite surface of a magnetic tape to the magnetic layer is worn out by contact with a guide pole or a fixed pole and the like: dropouts increase upon magnetic recording; its friction coefficient increases and the edge of the tape is easily bent. Therefore, further improvements are necessary for the backing layer. There are still problems that when a magnetic tape is rolled, unevenness of the backing layer transfers through on the magnetic layer, thereby deteriorating the electromagnetic properties of the magnetic layer such as its C/N characteristics.

SUMMARY OF THE INVENTION

An object of the present invention is to provide a novel process for preparing a magnetic recording medium having excellent running durability without increasing the friction coefficient, and having excellent electromagnetic properties with improved wear resistance of the backing layer.

It has now been found that these and other objects of the present invention are attained by a process for preparing a magnetic recording medium comprising the steps of (a) forming a magnetic layer on one surface of a non-magnetic support, and (b) homogeneously dispersing an α-Al$_2$O$_3$ particle having an average particle size of about 0.1 μm or less in a solvent to form a dispersion, mixing the thus-prepared dispersion with a binder to provide a coating composition, and applying the coating composition to the opposite surface of said non-magnetic support to form a backing layer.

DETAILED DESCRIPTION OF THE INVENTION

The present invention will be described in more detail hereinafter. The manufacturing process of the present invention fundamentally requires forming a magnetic layer on a surface of a non-magnetic support and forming a backing layer on the opposite surface of the non-magnetic support to the magnetic layer by coating a coating composition for forming a backing layer.

The support to be used includes plastic films made of polyesters (e.g., polyethylene terephthalate and polyethylene naphthalate), polyolefins (e.g., polypropylene), cellulose derivatives (e.g., cellulose triacetate and cellulose diacetate), vinyl resins (e.g., polyvinyl chloride), polycarbonate resins, polyamide resins, polysulfone, etc.; metallic sheets, such as aluminum, copper, etc.; a glass plate; and ceramics. The support may previously be subjected to surface treatment, such as corona discharge, plasma treatment, subbing treatment, heat treatment, metal deposition, alkali treatment, and the like. The shape of the support is not limited.

The magnetic layer provided on a non-magnetic support includes a thin film type magnetic layer and a coated type magnetic layer. The magnetic layer of the present invention may be any one of those. The thin film magnetic layer is formed using ferromagnetic composition of metals such as iron, cobalt or nickel, alloys mainly composed of those metals or the oxides thereof by a vapour deposition method such as vacuum evaporation, sputtering or ion plating and by a metal plating method such as electro-plating or electroless plating. The coated type magnetic layer is formed by homogeneously dispersing ferromagnetic composition such as, for example γ-Fe$_2$O$_3$, Fe$_3$O$_4$, FeOx ($1.33 < x < 1.5$), Fe fine particles, CrO$_2$, Co-modified γ-Fe$_2$O$_3$, Co-modified Ba ferrite or Co-modified Sr-ferrite, preferably having a specific surface area of 40 m$^2$/g or more in a binder such as a conventionally known thermoplastic resin, thermosetting resins, reacting type resins or a mixture thereof to prepare a coating composition and then coating the thus prepared coating composition. The above methods are conventionally known methods described in Japanese Patent Publication Nos. 23625/65, 28368/64, 26890/81 and 13181/66 and U.S. Pat. No. 3,473,960. The magnetic layer of the present invention can be provided on the nonmagnetic support by optionally selecting the above described materials and methods.

A backing layer is provided on the surface of the non-magnetic support opposite the surface having a magnetic layer in the magnetic recording medium of the present invention. The backing layer is fundamentally composed of inorganic particles and a binder for bonding the inorganic particles. In particular, the present invention requires the use of α-Al$_2$O$_3$ super fine particles having an average particle diameter of about 0.1 μm or less, preferably from about 0.08 to 0.03 μm as inorganic particles which are conventionally known as an abrasive agent, and in the dispersing method for improving the poor dispersibility of α-Al$_2$O$_3$ particles. The α-Al$_2$O$_3$ is commercially available under the trade name of "HIT-100" manufactured by Sumitomo Chemical Co., Ltd.

The binder for a backing layer of the present invention can be selected from those generally known as a binder for a magnetic layer, and specifically is a conventional thermoplastic resin, a thermosetting resin, a reactive type resin or a mixture thereof.

Thermoplastic resins to be used have a softening point of about 150° C. or lower, an average molecular weight of from about 10,000 to about 300,000, and a degree of polymerization of from about 50 to about 1,000 and includes, for example, a vinyl chloride-vinyl acetate copolymer, a vinyl chloride-vinylidene chloride copolymer, a vinyl chloride-acrylonitrile copolymer, an acrylic ester-acrylonitrile copolymer, an acrylic ester-vinylidene chloride copolymer, an acrylic ester-styrene copolymer, a methacrylic ester-acrylonitrile copolymer, a methacrylic ester-vinylidene chloride copolymer, a methacrylic ester-styrene copolymer, a urethane elastomer, a nylon-silicone resin, a nitrocellulose-polyamide resin, polyvinyl fluoride, a vinylidene chloride-acrylonitrile copolymer, a butadiene-acrylonitrile copolymer, a polyamide resin, polyvinyl butyral, a cellulose derivative (e.g., cellulose acetate butyrate, cellulose diacetate, cellulose triacetate, nitrocellulose, etc.), a styrenebutadiene copolymer, a polyester resin, chlorovinyl etheracrylic ester copolymer, an amino resin, and various synthetic rubber thermoplastic resins, and mixture thereof.

The thermosetting resin or reactive resin to be used has a molecular weight of about 200,000 or less at the time of coating and, after drying, undergoes a reaction, such as condensation, addition, and the like, upon heating to have an unlimited increase in molecular weight. Among these resins, preferred are those which are not softened or melted during the time up to thermal decomposition. Specific examples of such resins are a phenol resin, an epoxy resin, a curing polyurethane resin, a urea resin, a melamine resin, an alkyd resin, a silicone resin, a reactive acrylic resin, an epoxy-polyamide resin, a nitrocellulose melamine resin, a mixture of a high-molecular polyester resin and an isocyanate prepolymer, a mixture of a methacrylate copolymer and a diisocyanate prepolymer, a mixture of a polyester polyol and a polyisocyanate, a urea formaldehyde resin, a mixture of a low-molecular weight glycol, a high-molecular weight diol, and triphenylmethane triisocyanate, a polyamine resin, and mixture of these resins.

The binder which can be used in the present invention preferably is resins having a hydrophilic group, for example, a polyurethane resin having a —COOM$^1$ or —SO$_3$M$^1$ group, wherein M1 represents a hydrogen atom or an alkali metal, e.g., sodium potassium, lithium, etc.; a vinyl

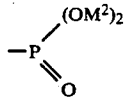

group, wherein M$^1$ is as defined above; and M$^2$ represents a hydrogen atom, an alkali metal (e.g., Li, Na, K, etc.), or a hydrocarbon group having from 11 to 20 carbon atoms; and a polyester resin having an —SO$_3$M$^1$ group wherein M$^1$ is as defined above.

Details of these binder resins are described in Japanese Patent Application (OPI) Nos. 8127/84, 92422/82, 2423/82, and 40320/74 (the term "OPI" as used herein means an "unexamined published Japanese patent application").

Specific examples of the hydrophilic group containing resins are "TIM-3005" (—COOH-containing polyurethane produced by Sanyo Kasei Co., Ltd.), "UR-8300" (SO$_3$Na-containing polyurethane produced by Toyobo Co., Ltd.), "400-110A"(COOH-containing vinyl chloride-vinyl acetate copolymer produced by Nippon Zeon Co., Ltd.), "Vylot 530" (—SO$_3$Na-containing polyester produced by Toyobo Co., Ltd.), and "MR-110" (—SO$_3$Na-containing vinyl chloride-vinyl acetate copolymer produced by Nippon Zeon Co., Ltd.). A preferred content of the hydrophilic group ranges generally from about 1 to 10,000 equivalents/10$^6$ gram and preferably from about 10 to 5,000 equivalents/10$^6$ gram. A preferred molecular weight of these resins is generally from about 10,000 to 20,000 and preferably from about 10,000 to 15,000.

The binder used in the backing layer is prepared using one or more kinds of the above described binders and binders having a glass transition temperature Tg of about 40° C. or higher, particularly about 60° C. or higher is preferably employed.

The coating composition for forming a backing layer is prepared as follows. A dispersion of $\alpha$-Al$_2$O$_3$ particles uniformly dispersed therein is prepared by, for example, dissolving a small amount (i.e., from 1/10 to 1/20 parts by weight per part by weight of $\alpha$-Al$_2$O$_3$ particles) of a selected binder in a solvent (the amount of solvent is from 1.5 to 2 parts by weight per part by weight of $\alpha$-Al$_2$O$_3$ particles) to prepare a binder solution, adding $\alpha$-Al$_2$O$_3$ particles and a binder (the amount of the binder is from 1/10 to 1/20 parts by weight per part by weight of the $\alpha$-Al$_2$O$_3$ particles) thereinto, mixing, kneading stirring by a sand mill for 10 to 50 hours and further adding the solvent (the amount of the solvent is from 1 to 2 parts by weight per part by weight of the $\alpha$-Al$_2$O$_3$ particles) thereinto. Thereafter, the resulting dispersion is added into the binder solution for a backing layer containing other components required for the backing layer and the whole dispersion is stirred to prepare a dispersion of $\alpha$-Al$_2$O$_3$ uniformly dispersed therein as a coating composition for a backing layer. Accordingly, when $\alpha$-Al$_2$O$_3$ super fine particles are dispersed in a binder composition, those super fine particles themselves are uniformly dispersed in a solvent beforehand, and then the resulting dispersion is added into the binder solution wherein most of the binder or components for a backing layer is dissolved.

The solvent for dissolving the binder includes ketones, e.g., acetone, methyl ethyl ketone, methyl isobutyl ketone, cyclohexanone, isophorone, tetrahydrofuran, etc.; alcohols, e.g., methanol, ethanol, propanol, butanol, isobutyl alcohol, isopropyl alcohol, methylhexanol, etc.; esters, e.g., methyl acetate, ethyl acetate, butyl acetate, isobutyl acetate, isopropyl acetate, ethyl lactate, glycol acetate,etc.; monoethyl ether; diethyl ether; glycol ether, e.g., glycol dimethyl ether, glycol monomethyl ether, dioxane, etc.; aromatic hydrocarbons, e.g., benzene, toluene, xylene, cresol, chlorobenzene, styrene, etc.; chlorinated hydrocarbons, e.g., methylene chloride, ethylene chloride, carbon tetrachloride, chloroform, ethylene chlorohydrin, dichlorobenzene, etc.; N,N-dimethylformamide; hexane; and so on.

If desired, various dispersing agents, lubricating agents, antistatic agents and various surface active agents can be added to the coating composition for the backing layer. The above additives are disclosed in Japanese Patent Publication No. 26890/81.

The super fine particles of abrasive particles having a particle diameter of about 0.1 μm or less are used in preparing a coating composition for the backing layer, and such fine particles agglomerate readily when dispersing those particles. Therefore, a particle dispersion is prepared independently in a long period of term (e.g., 10 to 50 hours) to avoid the agglomeration thereof, and thereafter the resulting dispersion is added into the coating composition for forming a backing layer.

The method for dispersion treatment is not particularly restricted. The order of adding various components, including the α-Al$_2$O$_3$ powder dispersion, can be selected appropriately. Apparatuses to be used for dispersing can appropriately be selected from among a two-roll mill, a three-roll mill, a ball mill, a pebble mill, a trommel, a sand grinder, a sand mill, an attritor, a high-speed impeller, a dispersing machine, a high-speed stone mill, a high-speed impact mill, a disper, a kneader, a high-speed mixer, a ribbon blender, cokneader, an intensive mixer, a tumbler, a blender, a disperser, a homogenizer, an ultrasonic dispersing machine, and the like.

The thus prepared coating for the backing layer thus dispersed is coated on a non-magnetic support by various known coating techniques, such as air doctor coating, blade coating, air knife coating, squeeze coating, dip coating, reverse roll coating, transfer roll coating, gravure coating, kiss coating, cast coating, spray coating and the like. The coating amount thereof is used so that the dry thickness of the backing layer is about 2 μm or less, preferably from about 0.3 to 1.5 μm, most preferably from about 0.5 to 1.0 μm.

Further, the magnetic layer is coated on a non-magnetic support by the various known coating techniques described above, and immediately is subjected to orientation in a magnetic field during drying, if desired. The magnetic layer is completely dried at a temperature of from 22° to 120° C. while travelling at a carrying speed of 10 to 500 m/min. The magnetic layer is subjected to surface smoothing treatment, if desired and then is cut to a desired shape to prepare a magnetic recording material of the present invention. This method for preparing the magnetic layer is described in Japanese Patent Publication Nos. 23625/65, 28368/64, 26890/81 and 13181/66, and U.S. Pat. No. 3,473,960.

The backing layer thus provided on a support by the various methods as described above is dried by a conventional method described in Japanese Patent Publication Nos. 23625/65, 28368/64, 26890/81 and 13181/66, and U.S. Pat. No. 3,473,960 using a conventional drying device. The coating and drying technique are conventional.

The thus coated layer may be subjected to a conventional calendering treatment for the magnetic layer and slit or cut to a desired shape to obtain a magnetic recording medium.

The present invention is now illustrated in more detail with reference to the following Examples, but the present invention is not to be construed as being limited thereto. Unless otherwise indicated, all parts, percents and rates are by weight.

EXAMPLE 1 AND COMPARATIVE EXAMPLE 1

A uniform magnetic composition having the following formulation was coated on a polyethylene terephthalate film having a thickness of 14 μm to obtain a magnetic layer having a dry thickness of 3.0 μm.

| Magnetic Composition Formulation: | parts |
| --- | --- |
| Co containing γ-Fe$_2$O$_3$ (specific surface area (SBET): 45 m$^2$/g) | 100 |
| Vinyl chloride-vinyl acetate-maleic anhydride copolymer "400X110A", produced by Nippon Zeon Co., Ltd.) | 12 |
| Urethane resin ("N-2301" produced by Nippon Polyurethane Co., Ltd.) | 12 |
| Polyisocyanate ("Colonate L", produced by Nippon Polyurethane Co., Ltd.) | 8 |
| Carbon black (average particle size 0.04 μm) | 2 |
| Methyl ethyl ketone | 300 |

The α-Al$_2$O$_3$ particles having various particle diameters as shown in Table 1 were added directly into the composition of nitrocellulose, urethane resins and methyl ethyl ketone and were dispersed by a sand grinder for 10 hours to prepare a uniformly dispersed α-Al$_2$O$_3$ particle dispersions.

On the other hand, the coating composition for forming a backing layer having the following formulation was dispersed and in the midway, the above described α-Al$_2$O$_3$ particles dispersion was added thereinto and further uniformly dispersed to prepare a uniformly dispersed dispersion as a coating composition for the backing layer.

| Formulation of the coating composition for a backing layer | |
| --- | --- |
| | (parts by weight) |
| Nitrocellulose | 25 parts |
| Urethane resin ("Nipporan 2301", a trade name, manufactured by Nippon Polyurethane Co., Ltd.) | 15 parts |
| Polyisocyanate ("Collonate L", a trade name, manufactured by Nippon Polyurethane Co., Ltd.) | 40 parts |
| The above α-AL$_2$O$_3$ dispersion | 20 parts |
| Methyl ethyl ketone | 480 parts |

The thus prepared coating compositions for the backing layer was coated in a dry thickness of 0.8 μm on the surface of a polyethylene terephthalate film having a 14 μm thickness on the opposite surface to the magnetic layer coated with a dispersion of Co-containing iron oxide particles as ferromagnetic particles and dried to obtain video tapes, as identified as Sample Nos. 1 to 6.

COMPARATIVE EXAMPLE 2

The same procedure as shown in Example 1 was repeated to prepare video tapes except that α-Al$_2$O$_3$ particles having different particle diameters as shown in Table 1 were directly added into the coating composition for the backing layer and dispersed. The thus obtained video tapes were identified as Sample Nos. 7 to 10.

COMPARATIVE EXAMPLE 3

The same procedure as in Example 1 was repeated to prepare video tapes except that inorganic particles (CaCO$_3$ or carbon black) as shown in Table 1 were used instead of α-Al$_2$O$_3$ used in Example 1. The thus obtained video tapes were identified as Sample Nos. 11 to 13.

Various tests were done on the samples obtained in the Example and Comparative Examples, and the results are shown in Table 1.

(1) Measurement of electromagnetic properties (C/N)

Each sample was run on VHS type VTR and the C/N ratio (ratio of noise to the reproduced RF output) was measured. C/N values are exposed as relative values when a VHS type video tape "Super XG-T-120", a trade name, manufactured by Fuji Photo Film Co., Ltd. was assumed to have a dB ratio.

(2) Measurement of friction coefficient

Each virgin sample was run on a VHS type tape deck and run for 200 passes, and thereafter, $T_2/T_1$ on the backing layer to a stainless steel pole was measured. The tape tension measured for sending out the tape of the rotating cylinder (i.e., a stainless pole) was $T_1$ and the tape tension for winding it up was $T_2$.

$T_1$ and $T_2$ were measured and the friction coefficient for the backing layer was calculated by the formula $T_2/T_1 = \exp(\mu m)$.

(3) Measurement of wear characteristics of the backing layer

Each virgin sample was run on a VHS type tape deck and run for 200 passes, and then the number of scratches formed on the surface of a backing layer was counted by a microscope ($\times 50$), and was evaluated by the following evaluation.

A: A number of scratches observed was 0.
B: A number of scratches observed was from 1 to 3.
C: A number of scratches observed was from 4 to 9.
D: A number of scratches observed was 10 or more.

As is apparent from the results in Table 1, Sample Nos. 1 to 3 obtained in accordance with the present invention exhibited excellent electromagnetic characteristics, friction coefficient, wear characteristics and durability of the backing layer. On the other hand, Sample Nos. 4 to 13 prepared in the Comparative Examples had poor electromagnetic characteristics, and high friction coefficients and wear of the backing layer was clearly observed.

It is clearly seen from the above results that the backing layer prepared in accordance with the method of the present invention is superior in electromagnetic characteristics, friction coefficient and wear and durability to the conventional layers. Therefore, the present invention is very useful.

While the invention has been described in detail and with reference to specific embodiments thereof, it will be apparent to one skilled in the art that various changes and modifications can be made therein without departing from the spirit and scope thereof.

What is claimed is:

1. A process for preparing a magnetic recording medium comprising the steps of (a) forming a magnetic layer on one surface of a non-magnetic support, and (b) homogeneously dispersing an $\alpha$-Al$_2$O$_3$ powder having an average particle size of about 0.1 $\mu$m or less in a solvent containing a small amount of a binder to form a dispersion, mixing the thus-prepared dispersion with a binder to provide a coating composition, and applying the coating composition to the opposite surface of said non-magnetic support to form a backing layer, wherein said small amount of binder in said solvent is from 1/10 to 1/20 parts by weight per part by weight of the $\alpha$-Al$_2$O$_3$ particles and the amount of said solvent is from 1.5 to 2 parts by weight per part by weight of the $\alpha$-Al$_2$O$_3$ particles.

2. The process as claimed in claim 1, wherein said $\alpha$-Al$_2$O$_3$ particles have an average particle diameter of from about 0.03 to 0.8 $\mu$m.

3. The process as claimed in claim 1, wherein said binder is selected from a polyurethane resin having a —COOM$^1$ or —SO$_3$M$^1$; a vinyl chloride resin having a —SO$_3$M$^1$, —COOM$^1$, —OSO$_3$M$^1$ or

TABLE 1

| Example | Sample No. | Inorganic particles as abrasive agents | | Results of measurement | | | |
|---|---|---|---|---|---|---|---|
| | | State of particles upon adding to the binder solution | Particle diameter ($\mu$m) | Electromagnetic properties C/N (dB) | Friction coefficient | | Wear of backing layer |
| | | | | | Initial stage | After 200 passes | |
| Example 1 | 1 | Dispersion of $\alpha$-Al$_2$O$_2$ particles | 0.03 | +0.6 | 0.25 | 0.30 | B |
| Example 1 | 2 | Dispersion of $\alpha$-Al$_2$O$_2$ particles | 0.06 | +1.5 | 0.22 | 0.23 | A |
| Example 1 | 3 | Dispersion of $\alpha$-Al$_2$O$_2$ particles | 0.10 | +1.0 | 0.20 | 0.22 | A |
| Comparative Example 1 | 4 | Dispersion of $\alpha$-Al$_2$O$_2$ particles | 0.3 | −0.5 | 0.15 | 0.20 | B |
| Comparative Example 1 | 5 | Dispersion of $\alpha$-Al$_2$O$_2$ particles | 0.5 | −1.5 | 0.10 | 0.15 | A |
| Comparative Example 1 | 6 | Dispersion of $\alpha$-Al$_2$O$_2$ particles | 1.0 | −2.0 | 0.10 | 0.35 | B |
| Comparative Example 2 | 7 | $\alpha$-Al$_2$O$_3$ particles (undispersed) | 0.03 | −0.5 | 0.15 | 0.45 | D |
| Comparative Example 2 | 8 | $\alpha$-Al$_2$O$_3$ particles (undispersed) | 0.06 | −1.0 | 0.10 | 0.40 | C |
| Comparative Example 2 | 9 | $\alpha$-Al$_2$O$_3$ particles (undispersed) | 0.1 | −1.5 | 0.10 | 0.41 | C |
| Comparative Example 2 | 10 | $\alpha$-Al$_2$O$_3$ particles (undispersed) | 0.5 | −2.0 | 0.10 | 0.35 | C |
| Comparative Example 3 | 11 | CaCO$_3$ | 0.05 | −0.5 | 0.30 | 0.5 or more | D |
| Comparative Example 3 | 12 | carbon black | 0.5 | −1.0 | 0.20 | 0.5 or more | D |
| Comparative Example 3 | 13 | carbon black | 0.05 | −0.5 | 0.25 | 0.5 or more | D |

group; and a polyester resin substituted with $-SO_3M^1$; wherein $M^1$ represents a hydrogen atom or an alkali metal, and $M^2$ represents a hydrogen atom, an alkali metal or a hydrocarbon group.

4. The process as claimed in claim 1, wherein said binder has a glass transition temperature of about 40° C. or higher.

5. The process as claimed in claim 1, wherein said binder has a glass transition temperature of about 60° C. or higher.

6. The process as claimed in claim 1, wherein said backing layer has a dry thickness of about 2 μm or less.

7. The process as claimed in claim 1, wherein said backing layer has a dry thickness of from about 0.3 to 1.5 μm.

* * * * *